UNITED STATES PATENT OFFICE.

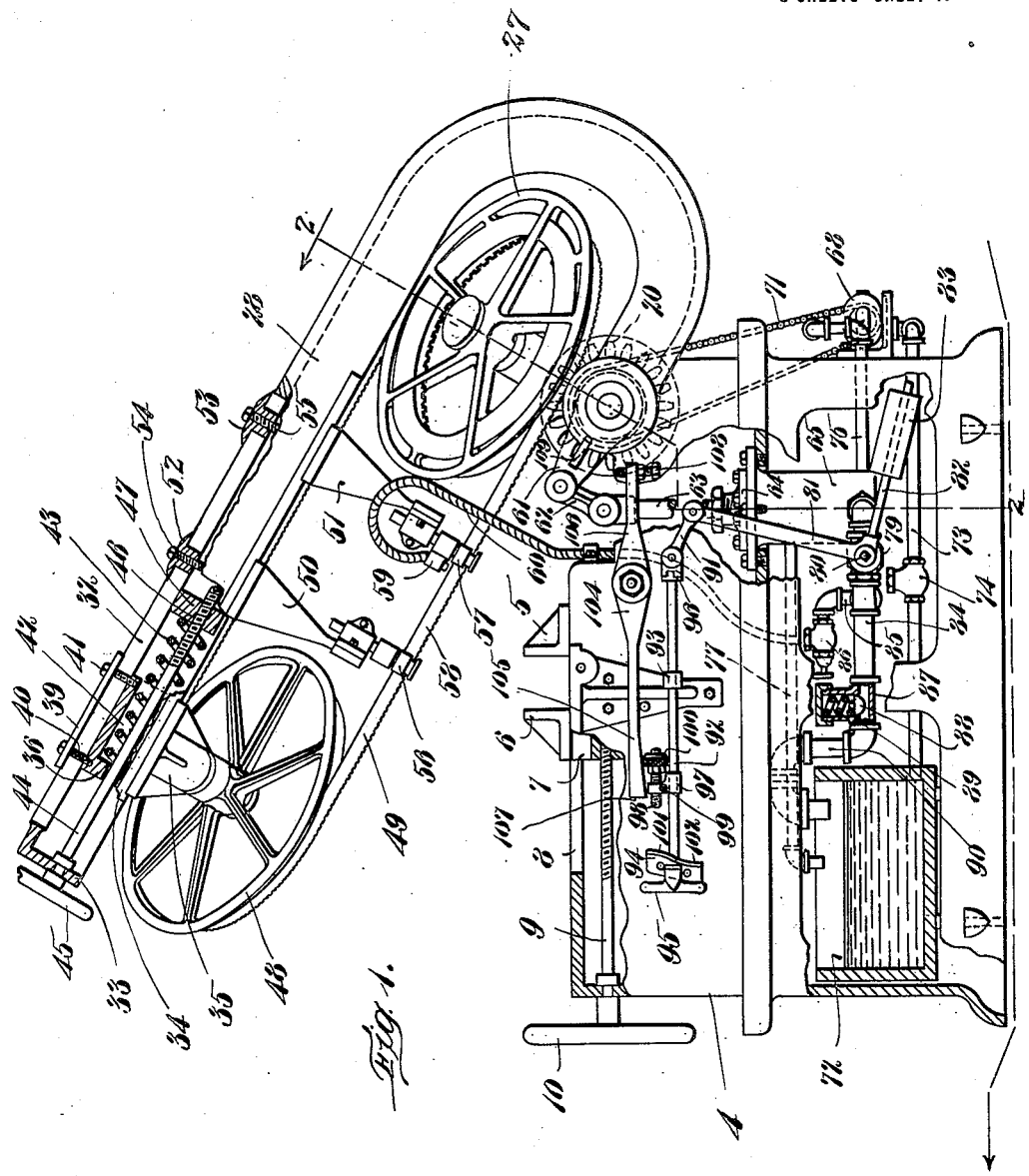

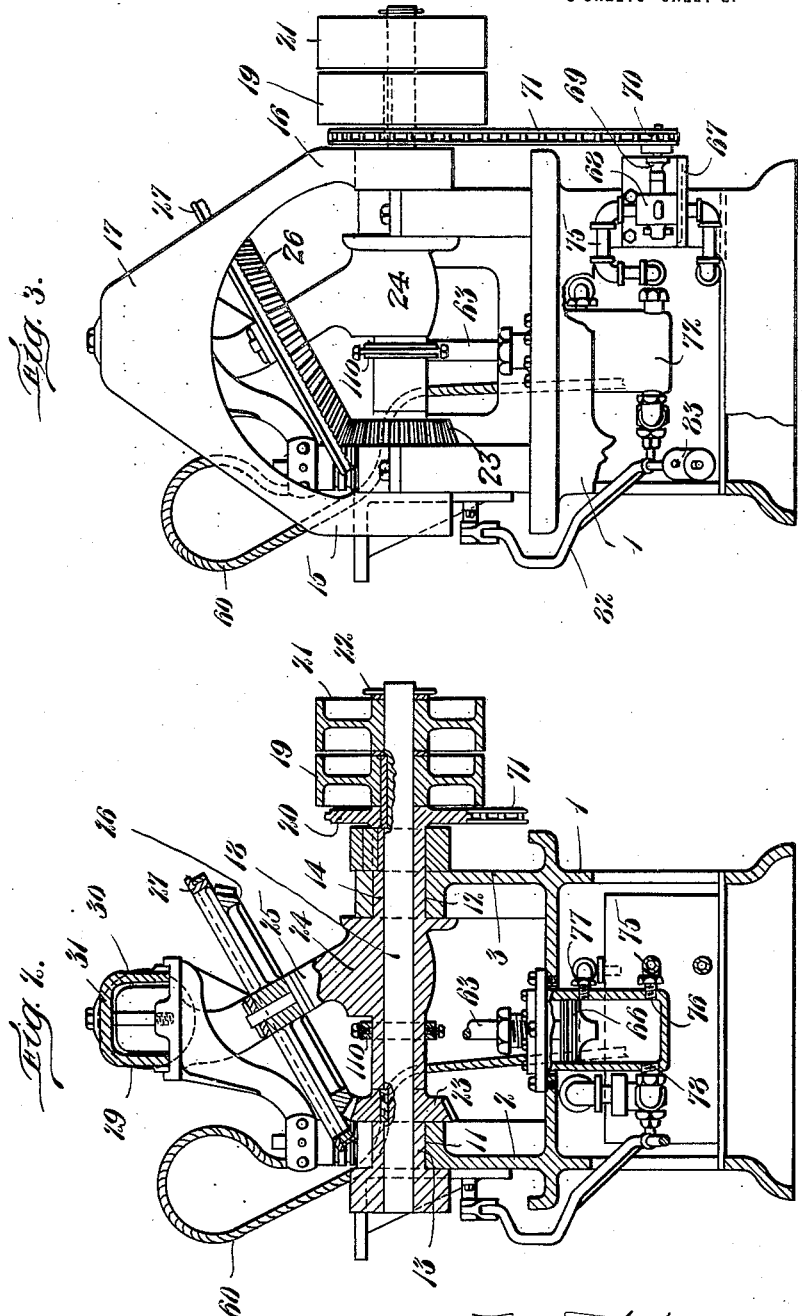

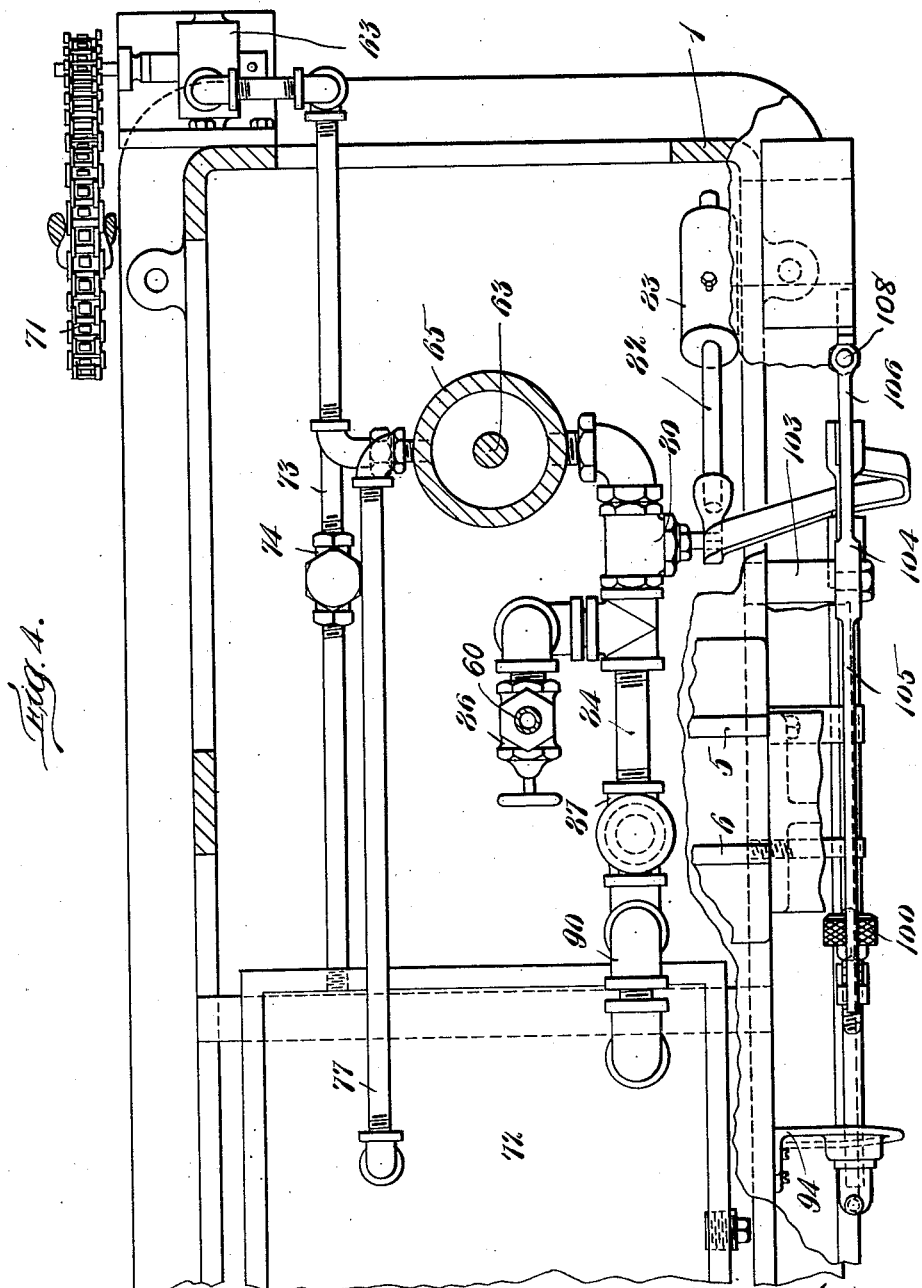

BYRON F. STOWELL, OF SPRINGFIELD, MASSACHUSETTS, ASSIGNOR TO METAL SAW AND MACHINE CO. INC., OF SPRINGFIELD, MASSACHUSETTS, A CORPORATION OF MASSACHUSETTS.

OPERATING DEVICE FOR CUTTING MACHINES.

1,421,107.     Specification of Letters Patent.     Patented June 27, 1922.

Application filed April 23, 1921. Serial No. 463,979.

*To all whom it may concern:*

Be it known that I, BYRON F. STOWELL, a citizen of the United States of America, and resident of Springfield, in the county of Hampden and State of Massachusetts, have invented new and useful Improvements in Operating Devices for Cutting Machines, of which the following is a specification.

This invention concerns machinery for working metal, wood or other material and especially relates to means for effecting the approach, separation, engagement of, or relative motions between the material worked upon and an implement for working upon the material, as well as to improved means for securing lubrication of the implement, and to means for properly tensioning a cutting blade, as for example a band saw, when such is the implement employed.

The invention in many of its aspects is useful in connection with and may be embodied in any machinery in which there is relative motion of approach or motion during contact between the material worked upon and any implement, tool, drill, grinder, saw, or other cutter intended to act upon the material in a regulated manner. To illustrate by one particular embodiment only the genus comprising the invention, this specification describes the invention as utilized in a band-sawing machine for cutting metal. In such machines as heretofore known, the essential elements comprise an endless band-saw, means for supporting and driving the saw, a work-vise or holder, and means permitting the saw and the material to be cut to be approached, and for thereafter permitting a regulated feeding motion of the saw into the work. Usually feeding is effected by moving the saw laterally of its running cutting edge in relation to relatively fixed material to be cut, but the work is sometimes moved to and upon the saw. In either case, effective control of the motion of approach of the saw and work, and of the feeding motion after contact of the saw, should be provided for.

It will be understood that in any machine of the kind improved, the proper rate of progress of the saw or other cutter into the work depends variably upon the hardness of the material being worked, the speed and gauge of the cutters and other factors, such as heating of the cutters. Many milling cutters, saws, drills, and other such tools are broken by an improvident speed of approach of the cutter to the work, or by a too rigid and vigorous feeding motion induced by rigid mechanical connections, and the nature of the screw-motions or gearing heretofore in many cases relied upon for such motions, inherently prevents a fine or delicate regulation of feed, dependence being upon the device of a series of rates of feed variable by sharply marked steps only. Such mechanical connections commonly depend upon the ratio of motion of cutter to the feed, whereas it may be highly desirable to vary the absolute motion of either the cutter or the feed, or both, independently of the motion of the other. It is frequently the case that the work is done at a less efficient rate than that at which the cutter will perform its function, because the next higher step of the ratio of feed to driving motion is dangerously high.

When the cutting implement is a band-saw, special difficulties are encountered. Either the work must be moved to the tool, thus introducing the problem of either moving parts often attached immovably, or of moving large or variable weights; or of moving one end of a large and awkward piece of material such as a shaft, rail or girder; or else the driving means, band-wheels and stretcher mechanism must be moved to the work, involving a feed-motion capable of dealing with these heavy parts while in motion.

For such purpose, mechanical feeding connections are inefficient, resulting in such difficulties in use and so many breakages of saws as to render machines designed on principles as heretofore used highly expensive, troublesome and impractical for many classes of work in which the rapid and continuous action of an endless cutter would be most advantageous if proper regulation of the approach and feeding movements could be attained. In the operation of an endless flexible cutting blade such as a band saw it is necessary for efficient work that the saw blade be maintained under a very considerable tension. Such tension is commonly obtained by adjustably positioning one or more guide pulleys or idlers about which, or in contact with which, the endless band travels. Such adjustment is commonly directly obtained by the use of adjusting screws or equivalent devices, but when so adjusted no yielding of the guide is permitted under abnormal conditions, as when, for example, particles of foreign matter, such as chips, are caught between the band and its guide pulley, or when the temperature suddenly changes thereby varying the effective length of the band. Moreover, in such cases the degree of tension is placed entirely within the discretion of the workman, who may, by neglect, fail to keep the band up to the proper tension, or on the other hand, may impose an excessive strain thereon such as to cause breakage or decrease its term of useful service.

Principal objects of the invention are to provide motor means for controlling the approach, separation, engagement or relative motion between an implement and material to be worked upon by the implement which shall lessen breakages and permit efficient function of the implement; to provide means under the control of the operator for automatically approaching the implement and the work at a relatively high speed, and thereafter automatically to cause relative motion between the implement and the work during cutting at a predetermined and readily adjustable slow rate suitable to the variable character of the work; to provide means acting with a predetermined force only, independently of the true rate of drive of the implement for causing relative motion between the implement and the work; and to provide improved means for lubricating the work and implement which are automatically made active during cutting only. A further object is to provide means for tensioning the cutting implement, when such implement consists of an endless flexible blade, which shall be of a yielding or resilient character such as to avoid the subjection of the blade to stresses of an injurious character, and which also serve to maintain a substantially uniform tension therein. Further objects in general are to provide operating means for machines for performing cutting operations which shall be capable and efficient and safe use by relatively unskilled attendants.

In the accompanying drawings, —

Fig. 1 is a side elevation with parts broken away, illustrating a preferred embodiment of the invention in which the material working implement is indicated as a band saw, such saw being shown in its inoperative or up position;

Fig. 2 is a cross section taken on the line 2—2 of Fig. 1, but with the saw and cooperating parts in working position;

Fig. 3 is an end elevation from the right hand side of the machine, as viewed in Fig. 1, and illustrating the parts as in operative position; and Fig. 4 is a plan view, certain parts being broken away and other parts being in section, and with the saw carrying frame removed.

Referring to the drawings, the base of the machine is indicated at 1, this base being preferably a hollow casting having a pair of posts 2, 3, projecting upwardly therefrom adjacent one end. Mounted upon the upper surface of the base, or formed integrally therewith, is a box-like support 4 having secured to its upper surface one jaw 5 of a work holding clamp, whose other jaw 6 is adjustable toward and from the jaw 5. Such adjustable jaw may have a depending fin 7 projecting through a slot 8 in the support 4, with which fin engages a screw threaded rod 9 having a hand wheel 10 for turning it. If desired the support 4 may be provided with integral webs uniting the same to the posts 2, 3. These posts are provided with aligned openings 11, 12, respectively for the reception of trunnions 13, 14, such trunnions being secured to or integral with a pair of depending spaced arms 15, 16, forming portions of a saw carrying frame 17. These trunnions are hollow and provide journal bearings for a shaft 18 which projects beyond the base at one side thereof and has secured thereto the fixed pulley 19 and the sprocket wheel 20. A loose pulley 21 is also mounted upon the projecting end of the shaft, being retained thereon by means of a cotter-pin 22, or in other suitable manner. Keyed to the shaft 18 at a point just inside the post 2 is a beveled gear 23.

Integral with the trunnion 12 is a sleeve 24 surrounding the shaft 18 and having upstanding therefrom a bracket 25, such bracket being provided with a spindle upon which freely turns a beveled gear 26, such gear being arranged to mesh with the gear 23, and to be driven thereby.

Compounded with the gear 26 is a guide and drive pulley 27, the purpose of which will be hereinafter referred to. The frame 17 comprises, in addition to the arms 15, 16, a longitudinally extending arm 28, such arm being of inverted U or channel shape in cross section, providing the side walls 29, 30, and the upper wall 31. The upper wall of the arm 28, adjacent its free extremity, is provided with a longitudinal slot 32 and the arm is closed at its end by a wall 33. A plate 34, provided with an outstanding bracket 35, is arranged slidably to engage the lower edges of the members 29, 30, such plate being provided with an upstanding block 36 slidably guided within the channed in the arm 28. A plate 39 rests upon the upper surface of the wall 31 and is connected to the block 36 by means of bolts 40, 41, such bolts passing through the slot 32 and being freely slidable therealong. The plate 39 thus serves to prevent the dropping of the block 36 and the plate 34 from the guide channel in the arm 28.

The block 36 is provided with a longitudinal bore 42 within which is seated one end of a coil spring 43. Passing through a suitable opening in the block 36 and through a hole in the end wall 33 of the arm is a rod 44, such rod being provided with a hand wheel 45 whereby it may be rotated, and being screw threaded at its opposite extremity as indicated at 48. A movable abutment 47 is slidable within the channel in the arm 28, such abutment having a screw threaded opening for engagement with the screw threads of the rod 44. The abutment 47 bears against the outer end of the spring 43, and by turning the hand wheel, 45, such spring may be tensioned whereby resiliently to move the block 36 with the bracket 35 longitudinally of the arm 28. The bracket 35 is provided with a pintle upon which is freely rotatable a guide pulley 48, such pulley being of a form and diameter substantially like that of the pulley 27—such pulleys serving to support an endless blade 49, preferably provided with teeth and thus constituting a band saw of usual form.

A pair of brackets 50, 51, are also arranged for sliding engagement with the lower edges of the members 29, 30 of the arm 28 and for securing such brackets in proper adjusted position, plates 52, 53 may be mounted upon the upper surface of the arm, such plates having secured therein bolts 54, 55, passing down through slot 32 and which engages the respective brackets. The brackets 50, 51, serve to support pairs of adjustable guide rolls as 56, 57, respectively, such rolls being adapted in a known manner to maintain that portion 58 of the blade which passes between the same in the plane of motion of the same about the axis 12. One or both of the brackets 50, 51, may be provided with projections as 59, serving to support the discharge end of a flexible conduit 60, such conduit serving to conduct lubricating fluid to the saw blade adjacent the cutting element thereof.

Secured to the sleeve 24 and movable therewith is an outstanding arm 61, such arm being connected by means of a link 62 with the upper end of a piston rod 63. The piston rod 63 extends downwardly through a cylinder head 64 fixed upon the upper end of a vertically disposed cylinder 65 arranged within the base 1 of the machine. To the lower end of the piston rod 63 is secured the piston head 66, closely fitting and slidable within the cylinder 65. Mounted upon the outer surface of the base is a bracket 67 serving to support a pump 68 of any suitable form, such pump being herein illustrated as of the rotary type having a shaft 69 to which is secured a sprocket gear 70. Motion is imparted to the gear 70 by means of a chain 71 driven by the sprocket gear 20 upon the shaft 18. While the pump has been illustrated as arranged upon the outside of the base it is evident that it might well be located within the same, while a rotary type of pump has been disclosed it is clear that fluid impelling means of other types might be substituted therefor without departing from the spirit of the present invention.

Within the hollow base 1 is arranged a fluid container or tank 72 and connecting the lower portion of said tank with the pump 68 is a pipe 73, such pipe having a check valve at 74 if desired to prevent draining of the pipe upon stopping of the pump. The delivery pipe 75 from the pump discharges into the lower end of the cylinder 65 at a point such as 76 whereby, upon actuation of the pump, fluid is drawn from the tank or receptacle 72 and forced under pressure into the cylinder 65. The cylinder 65 with its piston 66 thus constitutes a fluid or hydraulic motor through whose action the frame 17 may be swung about the axis of the shaft 18 by means of the connections 61 and 62.

At a point substantially removed from the bottom of the cylinder 65 there is provided an outlet opening in the side wall thereof to which is connected a pipe 77 which leads to the upper portion of the tank 72 and discharges freely thereinto. At a point substantially opposite the point 76 there is secured, in an opening in side wall of the cylinder 65, an outlet connection 78, such outlet connection leading to a valve casing 79. This valve casing is provided with a two-way valve of usual form having a stem 80 to which is fixed a bell crank lever comprising the upstanding arm 81 and the laterally extending arm 82. The arm 82 is provided with means constantly tending to swing such arm to a position such that the valve is closed, such means herein being illustrated as a weight 83, although other and equivalent means might well be substituted therefor. From the valve casing 79 extends a pipe 84 from which diverges a pipe 85 provided, if desired, with a globe valve 86 permitting the passage therethrough to be closed at will. From such globe valve extends the conduit 60, hereinbefore referred to.

The pipe 84 terminates in a pressure regulating device comprising a valve casing 87 having therein a plunger 88 actuated by a spring 89, such spring tending normally to so actuate the plunger 88 as to close the passage through the casing 87 but permitting fluid to flow therethrough under a predetermined pressure head. From the casing 87 leads a delivery pipe 90 which discharges freely into the upper portion of the receptacle 72.

The upper end of the lever arm 81 (Fig. 1) is connected by means of a link 91 with the end of a slidable rod 92, such rod being supported in brackets providing fixed guides at 93, 94, respectively. The rod 92 is provided with a handle 95 whereby it may be reciprocated in its guides. The rod 92 is not only arranged for reciprocation, but also for rotation about its axis, a suitable connection at 96 with the link 91 permitting such latter action.

Secured to the rod 92 is a bracket 97 having a screw threaded opening therein with which engages a screw threaded rod or pin 98. Such rod or pin is arranged substantially parallel to the axis of the rod 92, and may be adjusted longitudinally by turning it in the opening of the bracket 97. A clamping screw 99 is provided for retaining the rod 98 in adjusted position, and a set screw or equivalent means, not shown, may be employed for holding the bracket 97 in adjusted position on rod 92. The bearing bracket 94 comprises portions 101, 102, which are spaced apart in a direction longitudinal of the rod 92 and if desired such portions may form elements of a continuous cam-like surface.

A bracket 103 (Fig. 4) is secured to the side of the support 4 and pivotally mounted upon the end of said bracket is a lever 104, such lever comprising the elongated and weighted arm 105 and the relatively shorter arm 106. The arm 105 is provided with an end surface 107 (Fig. 1) which is adapted to engage the stop nut 100 in certain positions of the latter, it being apparent that the lever 104 swings in a substantially vertical plane. Mounted on the short arm 106 of the lever 104 is an adjustable stop screw 108, whose end lies in the path of movement of a normally fixed lug 109 carried by a collar 110 adjustably mounted upon the sleeve 24.

In the operation of the device, it being assumed that the parts occupy positions substantially as shown in Fig. 1, and that the drive belt for the machine engages the fixed pulley 19, the shaft 18 will be rotated and the pulleys 27, 48, and the saw 58 will be caused to move. At the same time, by means of the chain 71, the pump 68 will be actuated. With the parts in this position, the valve 79 is closed by reason of the action of weight 83, and it is impossible for fluid delivered by the pump to discharge through the pipes 84 or 85. Thus the fluid flowing into cylinder 65 will raise the piston 66, if not already in its uppermost position, until the fluid is able to escape through the overflow pipe 77.

The operator having placed material to be cut within the clamping jaws 5, 6, now grasps the handle 95 and pulls the rod 92 toward himself, thus swinging the lever arm 81 in a counterclockwise direction. The movement of the rod 92 is normally stopped by engagement of the end of the rod 98 with the surface 101 of the bearing bracket 94, but in such position the valve 79 is but partially opened. In this position of the parts more of the fluid than is delivered by the pump 68 may escape through the valve 79 and through the pipe 84, thus permitting the piston 66 slowly to descend, it being apparent that the weight of the arm 28 of the saw carrying frame, together with parts mounted thereon is sufficient to swing such frame in a counterclockwise direction when such action is permitted. If the operator wishes to permit the frame to descend rapidly, in order to bring the saw quickly into operative position, he may turn the rod 92 either prior to or simultaneously with the sliding of the same, so as to cause the stop pin 98 to contact with the surface 102 instead of the surface 101. This permits a greater longitudinal movement of the rod 92, and valve 79 may thus be opened to a greater and if desired to its full extent, thus allowing the fluid from the cylinder to flow out through the pipe 84 at a much higher rate than delivery into the cylinder by pump 68.

If now the operator wishes to slow down the speed of the descent of the saw frame it is merely necessary to turn the rod 92 back to the position indicated in Fig. 1, the pin or rod 98 traveling over the cam surface between the members 102, 101, which automatically serves to cam the rod 92 rearwardly whereby to bring the valve 78 to its predetermined intermediate position.

The sliding of the rod 92 serves to move the stop nut 100 from its normal inoperative position beneath the weighted arm 105 of the lever 104, thus permitting the said arm to drop behind the stop nut 100 whereby to prevent reverse movement of the rod 92 under action of the weight 83. The arm 105 thus serves as a latch to retain the rod 92 in its retracted position during the normal working of the machine. When however, in the descent of the saw frame, the member 109 contacts with the stop screw 108, the lever 104 is turned in a clockwise direction whereby to remove the member 105 from the path of the nut 100. The weight 83 is then free to swing the arm 82 in a clockwise direction thus closing the valve 79, whereupon the volume of fluid immediately builds up in the cylinder 65 and through the piston 66 automatically raises the saw frame to inoperative position.

It is evident that by reason of the adjustment provided at the pin 98 and at the nut 100 it is possible to regulate, not only the degree of opening of the valve 79 when the pin 98 contacts with the stop surface 101, but also to follow up such adjustment by means of the nut 100 whereby to provide the proper engagement of the latter with the surface 107 of lever arm 105 for retaining the valve in such position. It may also be noted that when the rod 92 is turned on its axis for permitting the full opening of the valve 79, the stop nut 100 is removed from the path of the lever arm 105, so that by so turning the rod 92 the operator is free to open or close the valve 79 if he so desires manually and to any desired extent.

As the fluid delivered through the valve 79 must pass through the casing 87 before discharging into the tank 72, and as the casing 87 is provided with the automatic pressure head regulating arrangement above described, it is clear that fluid pressure within the pipe 84 during the normal operation of the machine may be maintained at a constant point, and thus a portion of the fluid may be diverted through the pipe 85 and the conduit 60 for discharge at the cutting edge of the tool. The pressure regulating device comprising the casing 87, the piston 88 and the spring 89 is preferably so adjusted as to provide a pressure head just sufficient to cause discharge of the fluid at the cutting point when the saw frame is in its down or operative position, but to provide an insufficient pressure head to discharge fluid through the conduit 60 when the saw frame is in its up or inoperative position. Thus in a very simple and effective manner the provision of lubricating fluid at the cutting point is made dependent upon the operative or inoperative position of the latter, this being accomplished without the employment of mechanically operated valves or other similar devices.

When in the upward movement of the piston 66 the opening into the discharge pipe 77 is uncovered, the upward movement of the piston ceases and by reason of the fluid trapped within the lower end of the cylinder the saw frame is maintained in such position. It will be observed that the automatic return of the saw frame to inoperative position follows from the same having reached a predetermined depth of cut determined by the position of the collar 110 relative to the sleeve 24, and that the flow of lubricating fluid is begun as soon as the saw carrying frame has reached an operative position sufficiently low to permit the pressure head in the pipe 84 to cause discharge of fluid through the conduit 60. It will also be observed that the motion of the cutter while in the work is resisted by hydraulic resistance at the valve 79, together with the resistance of the pressure regulating device comprising the casing 87, but that the force pressing the cutter toward the work is only the unbalanced weight of the cutter carrying frame comprising the arm 28 and parts supported thereby. By this provision any resistance beyond normal to the advance of the cutter into the work will overcome the force tending to move the cutter further in, while the device can be depended upon to feed the cutter no faster than at such predetermined rate as the conditions of the work may demand.

I claim:

1. A material working machine having therein an implement for working on the material, means to support the implement, means to support the material, a reversible hydraulic motor acting on one of said supports to cause relative motion between the implement and the material in both directions, a valve for controlling said motor, and gravity actuated means normally tending to so actuate the valve as to bring the motor to rest.

2. A material working machine comprising supports for the material and for a material working implement, respectively, one of said supports being movable relatively to the other, fluid operated means for imparting movement to said movable support, a turnable valve for controlling said motor, means tending normally to turn said valve, and releasable latch means for restraining the valve from movement.

3. A material working machine comprising supports for the material and for a material working implement, respectively, the support for said implement being movable toward and from the material support, a fluid motor for controlling the movement of said movable support in either direction, a valve for determining the actuation of the motor, latch means for retaining said valve in a predetermined position, and means carried by the movable support and operative upon predetermined approach of said support to the material support to release said latch means.

4. A machine of the class described comprising an implement movable from inoperative to operative position, a hydraulic motor for controlling such movement, a valve for determining the actuation of the motor, means tending to turn said valve in one direction, a handle for moving said valve in the opposite direction, a latch lever for retaining the valve in the latter position of movement, and a device movable with the implement for releasing said latch lever from retaining position.

5. A machine of the class described having therein a support for the material, an implement for operating on the material, a movable frame for supporting the implement, a hydraulic motor for controlling the movements of said frame, a valve for controlling the operative flow of fluid through said motor, means normally tending to completely close said valve, a manually operable handle for opening said valve, and a releasable latch for retaining said valve in a partially opened position.

6. A machine having a work support, a frame movable toward and from said work support, a work manipulating implement carried by the frame, means tending to move the implement toward the work support, a hydraulic motor for controlling the rate of such movement, valve means for determining the operation of said motor, manual means for optionally moving said valve to partly or fully open position, releasable means for retaining said valve in partly open position, and automatic means for releasing said retaining means at a predetermined point in the movement of said frame.

7. A material working machine having a movable element, a motor for controlling the movements of said element, an oscillatable lever for determining the actuation of said motor, a weight tending to turn said lever in one direction, a rod connected to said lever for swinging it in the opposite direction, an adjustable stop member carried by said rod, and a latch lever having one end thereof swingable into holding engagement with said stop member.

8. A machine of the class described comprising a controlling valve, means tending normally to close said valve, and means operative for holding said valve in partly open position comprising a slidable rod having connection to the valve, a bracket fast to said rod, a screw rod mounted in the bracket, a stop nut engaging said screw rod, and a weighted latch lever normally tending to drop into a position to bring a portion therof into the path of said stop nut.

9. A machine of the class described having therein a controlling valve, means for actuating said valve comprising a slidable bar, a stop member carried by said bar, and an abutment for engagement by said stop member, the parts being so constructed and arranged that upon engagement of said stop with one portion of the abutment the valve will be partly opened to a predetermined extent, and upon engagement of the stop with another portion of the abutment the valve will be opened to a further predetermined extent.

10. A machine of the class described having therein a movable element, and means for actuating said element comprising a slidable and rotatable rod, a stop member projecting from the rod, and an abutment for engagement by said stop member upon axial movement of the bar, said abutment comprising portions spaced axially of the rod and engageable respectively by said stop member upon angular adjustment of the rod.

11. A material working machine having therein a movable element and means for moving said element comprising a slidable and rotatable rod, an adjustable stop screw carried by said rod and in substantially parallel relation thereto, an adjustable nut on said screw, a fixed abutment engageable by said screw in either of selected positions of angular adjustment of said rod, and a latch lever engageable with said nut in one only of such angular positions of the rod.

12. In a machine having a material cutting instrumentality, and means for moving said instrumentality from a relatively low working position to a relatively high idle position, means for lubricating the cutting instrumentality comprising a fluid conduit terminating at a point adjacent the cutting element of said instrumentality, and automatic means for determining a pressure head in such conduit such that when said instrumentality is in operative position fluid will be discharged from said conduit and when in inoperative position the flow of fluid will cease.

13. In a material working machine having a cutting implement movable upwardly from operative to idle position, means for lubricating the cutting element of said implement comprising a conduit having a divergent portion whose discharge end is arranged for movement with said implement, means for forcing fluid along said conduit, and a constantly operative back pressure valve in said conduit so constructed and arranged as to maintain a pressure head therein sufficient to cause fluid to be discharged from said divergent portion when the implement is in operative position but insufficient to produce flow of fluid therefrom when the implement is in idle position.

14. In a machine having a cutting instrumentality, a fluid motor for controlling certain movements of said instrumentality, means for supplying fluid under pressure to said motor, a fluid passage leading from said motor, a conduit diverging from said passage and terminating adjacent the cutting instrumentality, and a constantly operative device for determining the discharge pressure head in said passage.

15. A material working machine having a movable, material cutting instrumentality, a hydraulic motor for controlling material approaching movement of said instrumentality, means for supplying fluid under pressure to said motor, a passage for discharging fluid from the motor, a conduit diverging from said passage and leading to a relatively elevated point, and a spring actuated back pressure valve in said passage between the discharge end thereof and the junction of the conduit therewith.

16. A material cutting machine comprising a frame of inverted, channel cross section, the upper wall of said frame being longitudinally slotted, a guide pulley support comprising a member slidably engaging the lower edges of the frame and a block fitting within the channel thereof, said block having a longitudinal bore, a plate slidable on the upper surface of the frame and having connection through said slot with said block, a coil spring having an end seated in the bore in said block, a screw threaded rod passing freely through said block, an abutment having threaded engagement with said rod and engaging the opposite end of said spring, and manual means for turning said rod.

17. A machine of the class described comprising a blade holding frame, spaced guide pulleys thereon, one of said pulleys being movable toward and from the other, an endless flexible blade mounted upon said pulleys, a coil spring for urging said movable pulley away from the other pulley whereby to tension said flexible blade, and manually operable means for varying the normal degree of compression of the spring.

Signed by me at Springfield, Massachusetts, this 31st day of March, 1921.

BYRON F. STOWELL.